(12) United States Patent
Castelli et al.

(10) Patent No.: US 8,234,229 B2
(45) Date of Patent: Jul. 31, 2012

(54) METHOD AND APPARATUS FOR PREDICTION OF COMPUTER SYSTEM PERFORMANCE BASED ON TYPES AND NUMBERS OF ACTIVE DEVICES

(75) Inventors: Vittorio Castelli, Croton-on-Hudson, NY (US); Peter A. Franaszek, Mount Kisko, NY (US); Joy Aloysius Thomas, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 3428 days.

(21) Appl. No.: 09/916,935

(22) Filed: Jul. 27, 2001

(65) Prior Publication Data

US 2003/0023719 A1    Jan. 30, 2003

(51) Int. Cl.
  *G06F 15/18* (2006.01)
  *G06F 3/00* (2006.01)
  *G06F 1/00* (2006.01)
  *G06F 17/50* (2006.01)

(52) U.S. Cl. ............... 706/21; 710/15; 713/300; 703/13

(58) Field of Classification Search .................... 706/46, 706/14, 12; 709/224
See application file for complete search history.

(56) References Cited

U.S. PATENT DOCUMENTS

| 5,276,877 A * | 1/1994 | Friedrich et al. ............. 718/105 |
| 6,785,015 B1 * | 8/2004 | Smith et al. ................. 358/1.15 |
| 6,836,800 B1 * | 12/2004 | Sweet et al. ................. 709/224 |
| 2003/0005024 A1 * | 1/2003 | Grumann ..................... 709/102 |

* cited by examiner

*Primary Examiner* — Alan Chen
(74) *Attorney, Agent, or Firm* — F. Chau & Associates, LLC; Daniel P. Morris

(57) ABSTRACT

A method for predicting a subsequent resource utilization in a computer system having a plurality of devices includes the step of monitoring, over a period of time, a contemporaneous resource utilization and a number of active devices to obtain monitored values of the contemporaneous resource utilization and the number of active devices. The subsequent resource utilization is predicted, based upon the monitored values of the contemporaneous resource utilization and the number of active devices. Additionally, methods are described herein for identifying resource saturation and predicting the effects of adding a new device in a computer system.

41 Claims, 17 Drawing Sheets

METHOD AND APPARATUS FOR PREDICTION OF COMPUTER SYSTEM PERFORMANCE BASED ON TYPES AND NUMBERS OF ACTIVE DEVICES

BACKGROUND OF THE INVENTION

1. Technical Field

The present invention relates generally to computer systems and, in particular, to a method and apparatus for predicting the performance of a computer system based on the types of active devices in the computer system as well as the number of such devices.

2. Description of Related Art

With respect to a computer system that includes a plurality of personal computers, workstations, storage servers, database servers, mainframes, network-attached devices, routers, firewalls, and other devices, all interconnected by wired or wireless interconnection networks, the phrase "capacity management" refers to the management of shared or private computational, storage and communication resources to prevent their exhaustion. Such exhaustion of resources generally results in a loss of performance. Such resources include CPU utilization, disk utilization, available memory, server response time, available bandwidth at network nodes, and so forth. Some resources are private to individual machines, for example, the CPU utilization of personal computers. Other resources are shared, such as, for example, network bandwidth, the CPU utilization of transaction-processing systems and web-servers, the available disk space on storage servers, and so forth.

It is to be appreciated that the phrases "resource utilization" and "resource consumption" are used interchangeably herein. Additionally, as used herein, the term "resource" denotes generic monitored quantities.

Resource utilization has been described with respect to such techniques as linear regression and prediction. Some of these techniques are described by Kutner et al., in "Applied Statistical Models", Richard D. Irwin, Inc., 1985. U.S. Ser. No. 09/706,737, entitled "Method and Apparatus for Preprocessing Technique for Forecasting in Capacity Management, Software Rejuvenation and Dynamic Resource Allocation Applications", filed on Nov. 7, 2000, which is commonly assigned, and the disclosure of which is incorporated herein by reference, describes the use of preprocessed resource measurements to account for seasonal trends, or to decompose a measurement time series into a set of time series.

Conventional prediction of private-resource utilization customarily relies upon robust models that work under a wide range of assumptions. Such models are perforce simple: for example linear regression, combined with ARMA models for the error. It is also common to incorporate into the prediction mechanism corrections for periodic and seasonal trends (for example, daily, weekly, and monthly trends), that would otherwise reduce the reliability of the prediction.

The same techniques are also applied to the prediction of public-resource utilization. If the number of computing devices belonging to the computer system is fixed, this approach is sound. However, in reality, the number of computing devices connected to the network varies with time, and the above prediction methods fails to predict the impact of adding new devices.

When a private resource is monitored for capacity management, its predicted values are compared to a threshold that signifies exhaustion. For example, for available disk space, the threshold could be zero. For some resources there is no clear threshold. An example of such a resource is the response time of a server (storage, web, database, and so forth). Even for resources having a clear limit, the system performance could degrade significantly well before such limits are reached, and therefore a more conservative threshold should be used to guide capacity upgrades. Existing methods to account for this kind of behavior consist of injecting an artificial load on the network and measuring response times. The downsides of these methods are their disruptive nature (to measure saturation they induce it), and the artificial nature of the load, which need not reflect the actual characteristics of the real load experienced by the specific network.

Accordingly, it would be desirable and highly advantageous to have a method and apparatus for predicting the performance of a computer system, such method and apparatus overcoming the limitations and deficiencies of prior art methods and apparatus for accomplishing the same.

SUMMARY OF THE INVENTION

The problems stated above, as well as other related problems of the prior art, are solved by the present invention, a method and apparatus for predicting the performance of a computer system based on the types of active devices in the computer system as well as the number of such devices.

The present invention relates to a computer system where available resources are monitored to predict when the resources might became scarce or exhausted. The purpose of the prediction is to identify in advance resources that might become exhausted, so that the resources could be proactively upgraded or augmented. This invention can be used, for example, to manage distributed storage solutions, local area networks (LANs), and general computer networks. More specifically, the invention can be used to monitor and predict bandwidth, disk cache misses, and server response times of a distributed storage server, or to size network-attached disks given future loads and performance requirements.

The invention detects saturation using observations of real load and, therefore, is both minimally invasive while producing results that are tailored towards the specific operation of the network being analyzed.

Additionally, the invention assesses the impact on resources resulting from adding a new device to the network Accordingly, this feature of the invention can be used, for example, to assess the benefits of adding distributed storage devices (such as network-attached disks, or storage servers) to the network, and to identify potential bottlenecks that would reduce their effectiveness.

According to an aspect of the present invention, there is provided a method for predicting a subsequent resource utilization in a computer system having a plurality of devices. The method includes the step of monitoring, over a period of time, a contemporaneous resource utilization and a number of active devices to obtain monitored values of the contemporaneous resource utilization and the number of active devices. The subsequent resource utilization is predicted, based upon the monitored values of the contemporaneous resource utilization and the number of active devices.

According to another aspect of the present invention, there is provided a method for identifying resource saturation in a computer system having a plurality of devices. The method includes the step of monitoring, over a period of time, resource utilization and a number of active devices to obtain monitored values of the resource utilization and the number of active devices. Resource saturation is identified, based upon the monitored values of the resource utilization and the number of active devices.

According to yet another aspect of the present invention, there is provided a method for predicting effects of adding a new device on a computer system having a plurality of devices. The method includes the step of monitoring, over a period of time, a resource utilization and a number of active devices to obtain monitored values of the resource utilization and the number of active devices. The effects of adding the new device are predicted, based upon the monitored values of the resource utilization and the number of active devices.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

Figure 1:
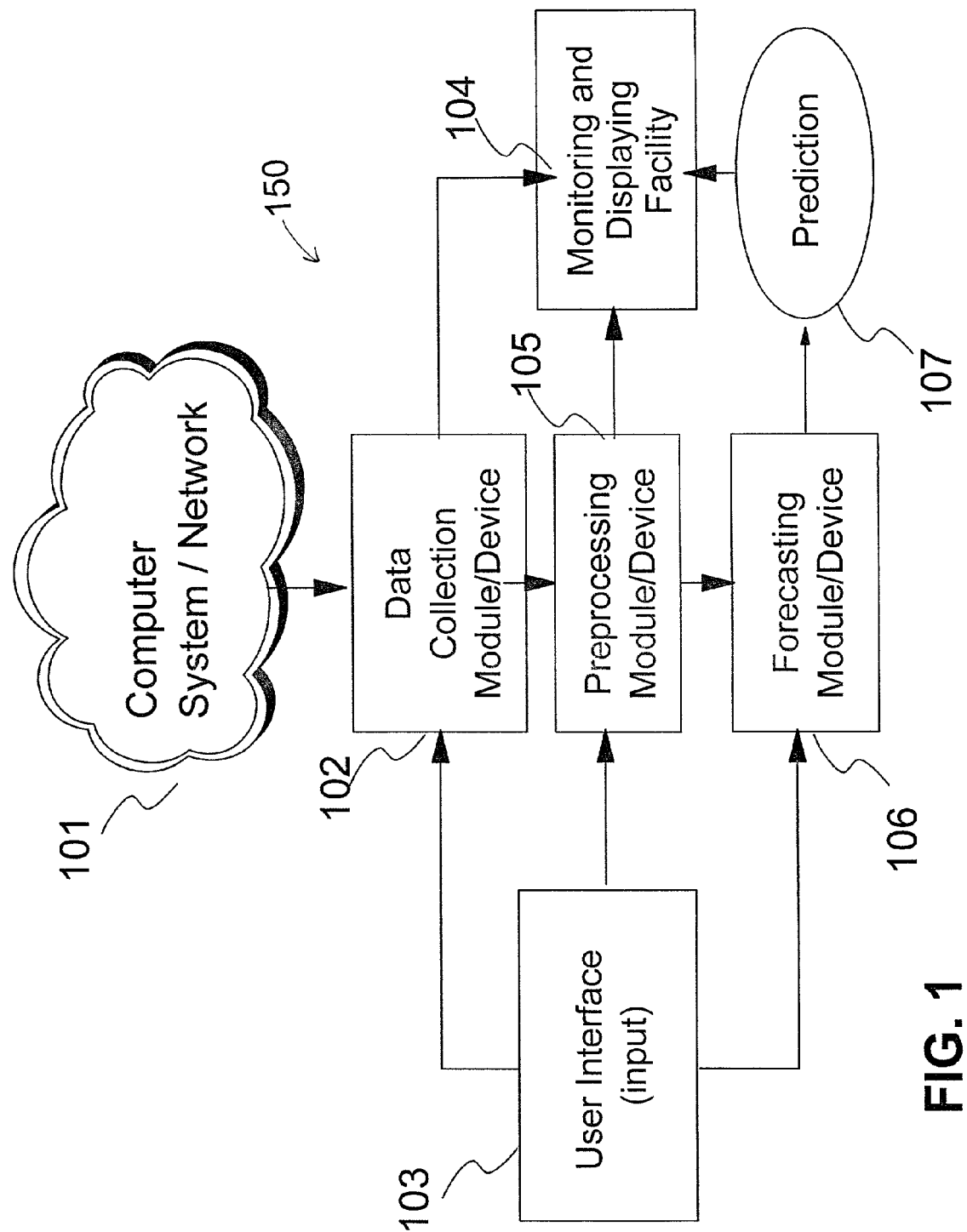
FIG. 1 is a diagram illustrating a computer system monitored by a capacity management system, to which the present invention may be applied according to an illustrative embodiment thereof.

FIG. 1 is a diagram illustrating a computer system 101 monitored by a capacity management system 150, to which the present invention may be applied according to an illustrative embodiment thereof. The capacity management system 150 includes a data collection module 102, a user interface 103, a monitoring and displaying facility 104, a preprocessing module 105, and a forecasting module 106. The forecasting module 106 outputs a prediction 107.

In a computer system that supports capacity management such as the computer system of FIG. 1, the monitoring and prediction software customarily acquires data from a plurality of devices (personal computers, portable computers, workstations, web-servers, network servers, storage servers, database servers, mainframes, network-attached devices, and so forth). The acquired data customarily includes the number of active devices (i.e., those device that are turned on) at each point in time.

As used herein, the computer system 101 is intended to include any configuration of one or more computers including, but not limited to, a single computer, a cluster of computers, or a computer network. The computer system 101 is monitored by the data collection module 102 which samples at known time instants quantities pertaining to the computer system 101. Such quantities include, but are not limited to, those that describe the functioning, operations, and behavior of the system. Examples are the available Megabytes in individual disks, the number of packets transmitted over individual links, the percentage of utilization of individual processors, the available swap space on individual computers, the number of processes running, and so forth. Other examples include aggregates over the entire system, such as the overall number packets transmitted over the entire network, or over subsets of the system, such as the total number of available Megabytes in all the disks managed by individual servers.

Data collection is known in the art and, in computer systems, is implemented by incorporating, within the data collection application, calls to routines that retrieve current values of quantities of interest. These routines can be part of the operating system, or part of the Application Programmer Interface (API) of software programs that manage resources. When resources are managed by hardware devices, and these hardware devices monitor the utilization of the resources, data can be collected by communicating appropriately with the device. For example, the device can store the values of the resources in its own memory, and the architecture of the computer system can map into its own memory space the memory of the device. In this case, the data collection program can read the values of the desired resources by reading the appropriate memory locations.

The data collection module 102 is controlled by a system administrator or an operator via the user interface 103 using specified data collection parameters, such as the quantities to be monitored and the sampling frequency.

The data collected by the data collection module 102 can be displayed by the monitoring and displaying facility 104 of the user interface. Data is commonly shown as periodically updated graphs.

The data collected by data collection module 102 is then preprocessed by the preprocessing module 105. The operation of the preprocessing module 105 is controlled by a system administrator or by an operator via the user interface 103, which can range from a configuration file to a complex graphical user interface. A result of the preprocessing module 105 can be displayed by the monitoring and displaying facility 104.

The preprocessed data serves as input to the forecasting module 106 which analyzes the preprocessed data and produces a prediction 107. The operation of the forecasting module 106 is controlled via the user interface 103, and the prediction 107 is displayed by the monitoring and displaying facility 104.

Data collection happens periodically or at predefined times. The operations of the preprocessing module 105, the forecasting module 106 and the monitoring and displaying facility 104 are repeated after every new data acquisition.

Those of ordinary skill in the related art will appreciate that the schema of FIG. 1 may be used for both capacity management and software rejuvenation systems.

Figure 2:
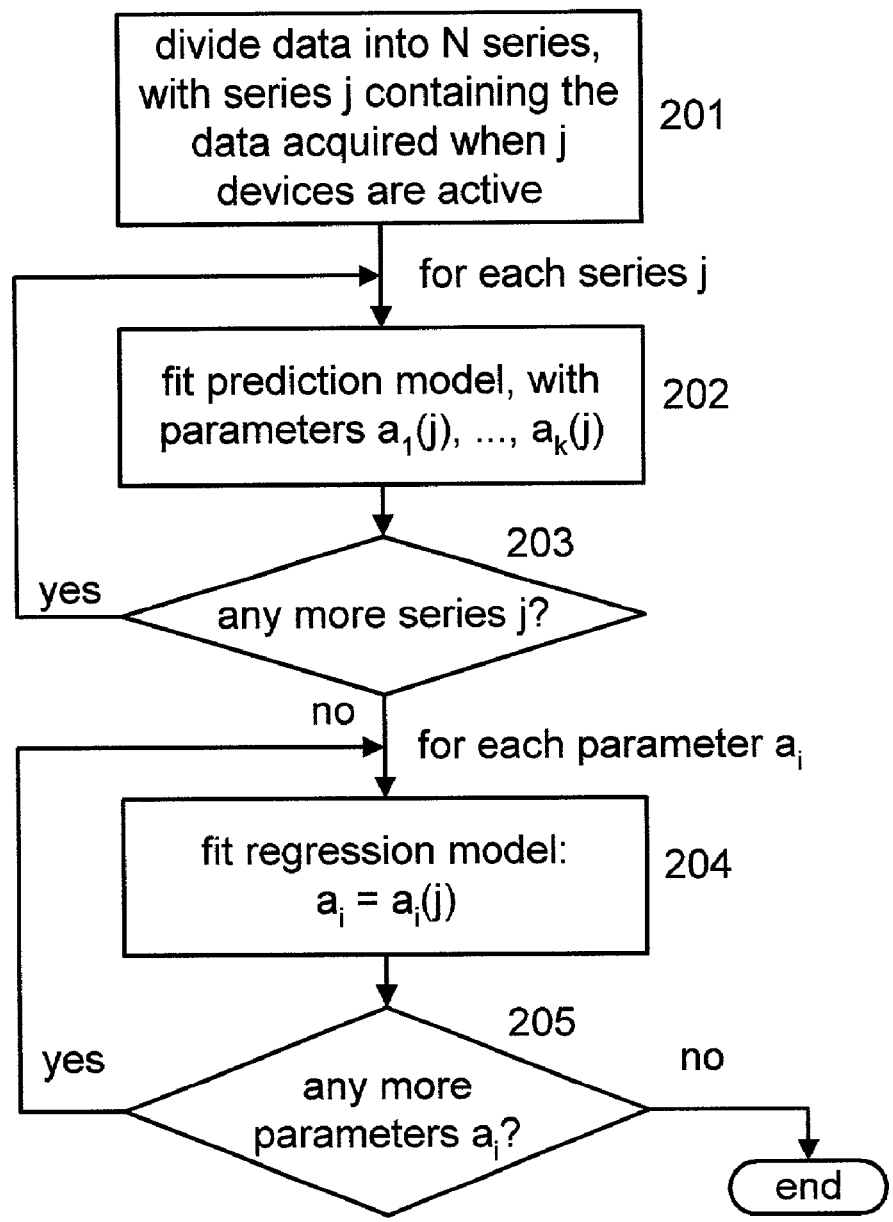
FIG. 2 is a flow diagram illustrating a method for accounting for the number of active devices in a computer system and producing a prediction model for a resource of the computer system, according to an illustrative embodiment of the present invention.

FIG. 2 is a flow diagram illustrating a method for accounting for the number of active devices in a computer system and producing a prediction model for a resource of the computer system, according to an illustrative embodiment of the present invention. Stated simply, FIG. 2 illustrates an example of processing collected data to account for the number of active machines in the computer system 101.

Data collected by the data collection module 102 is divided into groups (step 201). The division is as follows: for each monitored resource, the data collection module 102 produces a time series which, in a preferred embodiment, is a sequence of values of the resource each of which has an explicitly associated time of acquisition. In another preferred embodiment, each value of the sequence has an implicitly associated time of acquisition, for example, when the times of acquisitions are selected through the user interface 103. In the latter preferred embodiment, it is simple to produce a time sequence where each sample has an explicitly associated time of acquisition, as is evident to one of ordinary skill in the related art. The number of active devices at each collection time is available directly or indirectly from the data collected by data collection module 102.

Step 201 divides the time series of each resource monitored by the data collection module 102 into a collection of time series corresponding to 1, 2, . . . , N active devices respectively, where N is the number of devices monitored. It is presumed that the device or devices where the capacity management system of FIG. 1 runs are included in the count. Thus, at each acquisition time, there is at least one device active in the network. Time series j produced by step 201 for a specific monitored resource contains the values of the monitored resource acquired at acquisition times where exactly j devices are active in the network.

The loop formed by steps 202 and 203 limits the subsequent analysis to each time series, until all the time series produced by step 201 have been analyzed. Step 202 applies the operations of the preprocessing module 105 and the forecasting module 106 to each time series produced at step 201.

In one preferred embodiment, a parametric model is fit to a time series, producing parameter values $a_1(j), \ldots, a_k(j)$ (step 204). Here, the subscript 1, . . . , k is used to differentiate between different parameters of the same model, while the argument j in parenthesis is used to differentiate between models corresponding to different numbers of active systems. When all the time series of a specific monitored resource have been analyzed, the loop formed by steps 204 and 205 limit the analysis to each parameter of the fitted models. For the jth parameter, step 204 fits a regression model to the set of pairs $(1, a_1(j)), (2, a_2(j)), \ldots, (k, a_k(j))$, namely, a model that describes the dependence of the parameter on the number of active devices.

Figure 3:
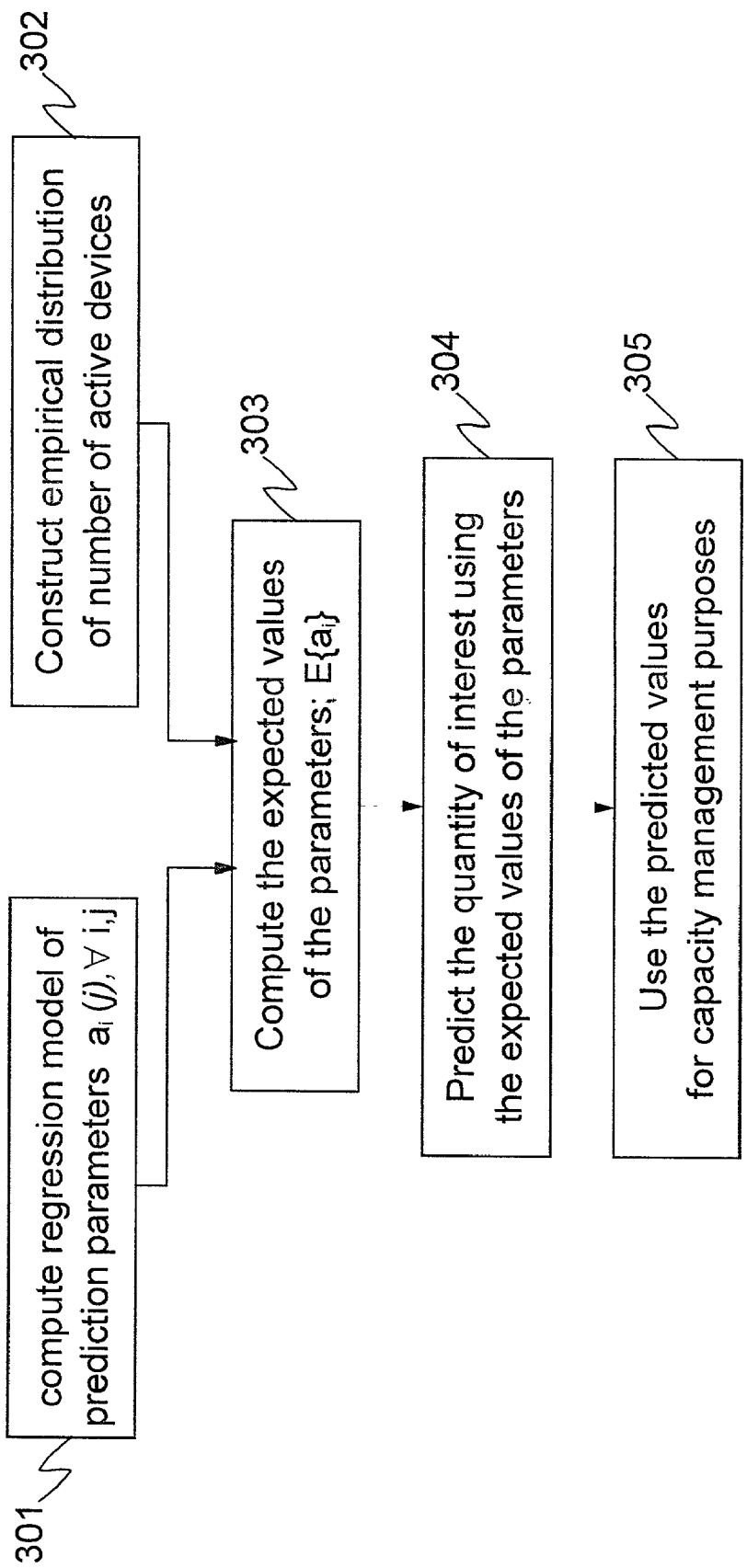
FIG. 3 is a flow diagram illustrating a method for combining a model produced by the method of FIG. 2 with an estimate of the distribution of the number of active devices to predict the utilization of a resource, according to an illustrative embodiment of the present invention.

FIG. 3 is a flow diagram illustrating a method for combining a model produced by the method of FIG. 2 with an estimate of the distribution of the number of active devices to predict the utilization of a resource, according to an illustrative embodiment of the present invention. That is, FIG. 3 illustrates a method for using features of the present invention to improve upon the prediction of monitored quantities, by taking into account the variability in the number of devices.

A regression model is computed of the prediction parameters on the number of active devices (step 301). In a preferred embodiment, step 301 corresponds to the method of FIG. 2.

The empirical distribution of the number of active devices is constructed (step 302). The expected value of the prediction parameters is computed (step 303), using the regression model produced by step 301 and the empirical distribution produced by step 302. In a preferred embodiment, the empirical distribution is the proportion of time when the number of active devices is 0, 1, 2, and so forth. In this case, the expected values of each parameter are computed by multiplying the regressed values corresponding to 0, 1, 2, and so forth active devices, times the corresponding proportions produced by step 302. In another embodiment, step 302 models the number of active devices using a stochastic process, for example, a Markov Chain; in this embodiment, step 302 produces the stationary distribution of the Markov chain.

The resource is predicted (step 304), using the expected values of the parameters. The resulting prediction is used for capacity management purposes (step 305).

Figure 4:
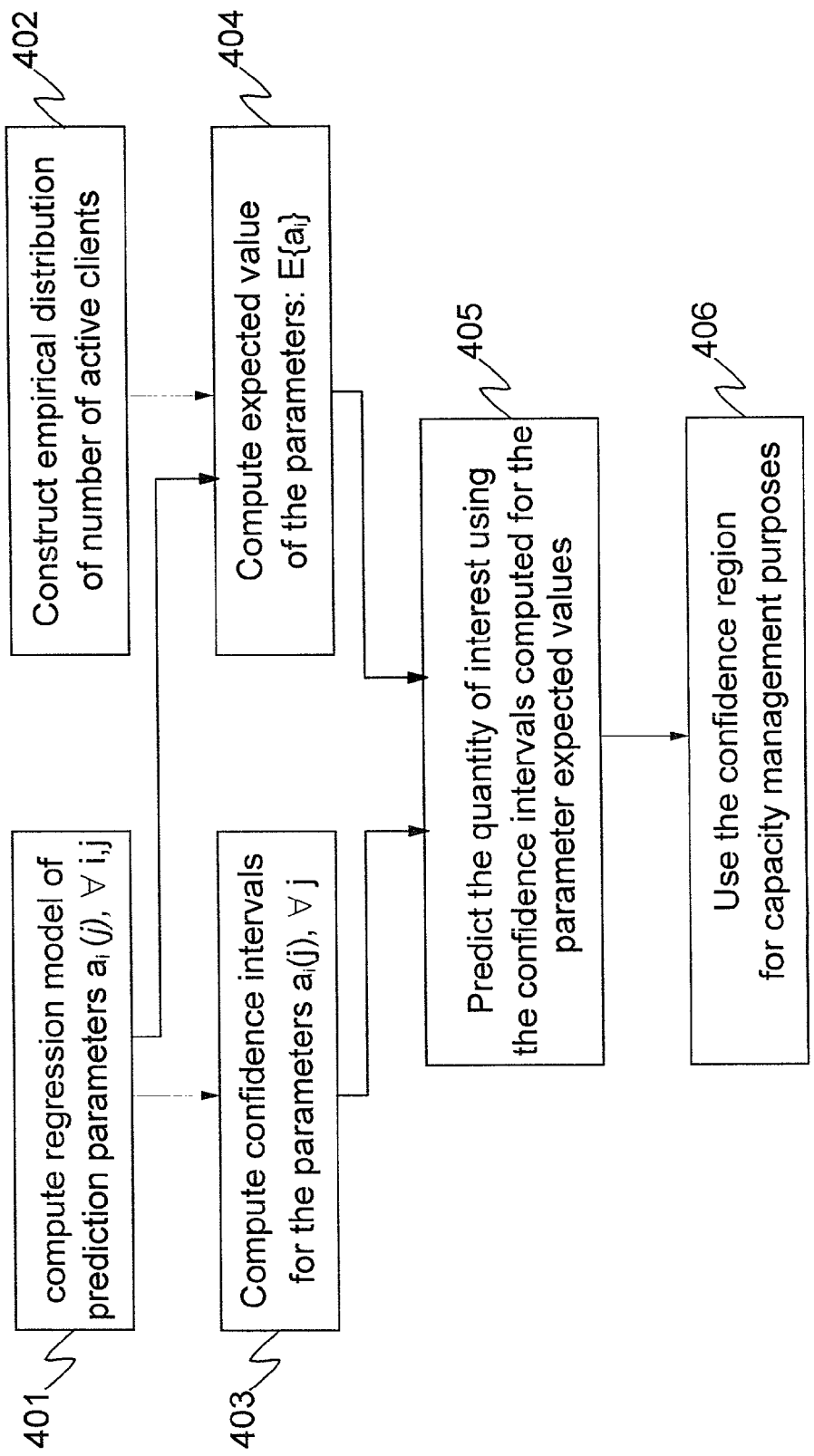
FIG. 4 is a flow diagram illustrating a method for combining the model produced by the method of FIG. 2 with an estimate of the distribution of the number of active devices to produce confidence intervals to predict the utilization of a resource, according to an illustrative embodiment of the present invention.

The features of the present invention apply to capacity management scenarios where prediction relies on confidence intervals. FIG. 4 is a flow diagram illustrating a method for combining the model produced by the method of FIG. 2 with an estimate of the distribution of the number of active devices to produce confidence intervals to predict the utilization of a resource, according to an illustrative embodiment of the present invention.

The regression model of the prediction parameters on the number of active devices is computed (step 401). In a preferred embodiment, step 401 corresponds to the method of FIG. 2.

The confidence intervals are computed for the regression model of the prediction parameters (step 403). One of ordinary skill in the related art will appreciate that known methods for computing exact and approximate confidence intervals can be used in step 403 to best fit the assumptions made in computing the regression model.

The empirical distribution of the number of active devices is computed (step 402). It is to be appreciated that step 402 is analogous to step 302 of FIG. 3.

The expected values of the parameters are computed (step 404), using the regression model and the empirical distribution of the number of active devices. It is to be appreciated that step 404 is analogous to step 303 of FIG. 3. The resource of interest is predicted (step 405), using the confidence intervals for the expected values of the parameters. One of ordinary skill in the related art will appreciate that for step 405 to achieve the desired confidence of the prediction, step 403 must select the value of the confidence accordingly. In a preferred embodiment, where the k prediction parameters are independent, and where the desired confidence associated with the prediction of step 405 is p (e.g., p=95%, namely, 0.95), step 403 must yield $(p)^{1/k}$ confidence intervals. Step 405 produces a confidence region for the predicted resource, namely, it produces a confidence interval for each predicted time.

The confidence region for the predicted resource is used for capacity management purposes (step 406).

Figure 5:
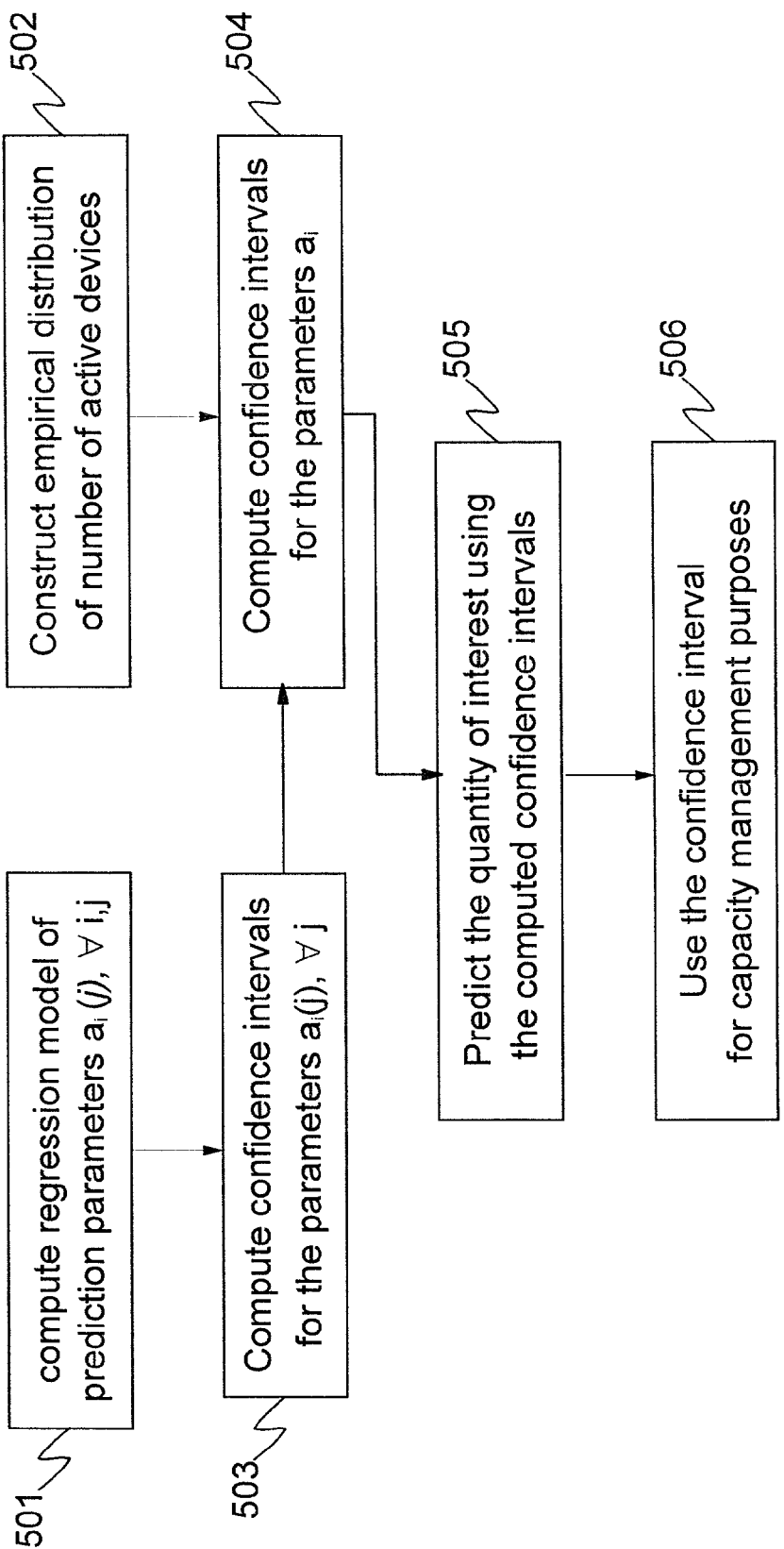
FIG. 5 is a flow diagram illustrating another method for combining the model produced by the method of FIG. 2 with an estimate of the distribution of the number of active devices to produce confidence intervals to predict the utilization of a resource, according to another illustrative embodiment of the present invention.

FIG. 5 is a flow diagram illustrating another method for combining the model produced by the method of FIG. 2 with an estimate of the distribution of the number of active devices to produce confidence intervals to predict the utilization of a resource, according to another illustrative embodiment of the present invention. Steps 501, 502 and 503 are analogous to steps 401, 402 and 403 of FIG. 4, respectively, and are thus not further described.

A confidence interval for the prediction parameters is computed (step 504), by combining the empirical distribution of the number of active devices and the confidence intervals for the prediction parameter (i.e., one interval per each value of the number of active devices). It is to be appreciated that step 504 operates on each prediction parameter individually. Moreover, it is to be further appreciated that steps 501 through 504 model the prediction parameters as random variables, decompose the distribution of individual parameters into a plurality of conditional distributions given the number of active devices, and combine the conditional distributions using the marginal distribution of the number of active devices. Accordingly, one of ordinary skill in the related art will readily contemplate how to implement the steps of FIG. 5 to reflect different assumptions on the conditional and marginal distributions. Steps 505 and 506 are analogous to steps 405 and 406 of FIG. 4, and are thus not further described for reasons of brevity.

Figure 6:
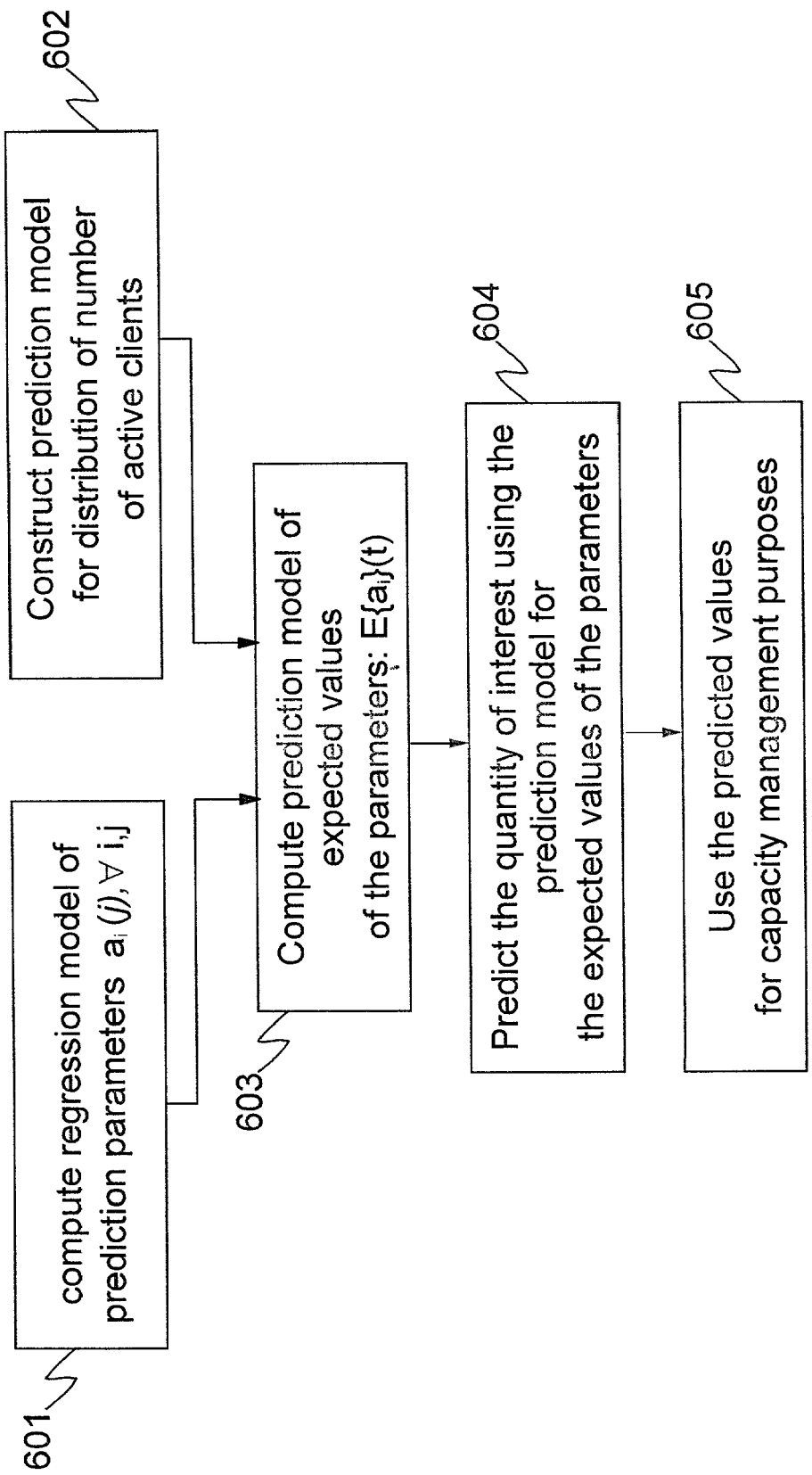
FIG. 6 is a flow diagram illustrating a method for combining the model produced by the method of FIG. 2 with a predictive model of the distribution of the number of active devices to predict the utilization of a resource, according to an illustrative embodiment of the present invention.

In practical computer systems, where old devices are permanently removed from the network, and new devices are added to the network, the distribution of the number of active devices changes with time. FIG. 6 teaches how to account for variations of the distribution of the number of active devices according to the present invention. In particular, FIG. 6 is a flow diagram illustrating a method for combining the model produced by the method of FIG. 2 with a predictive model of the distribution of the number of active devices to predict the utilization of a resource, according to an illustrative embodiment of the present invention.

Step 601 is analogous to step 301 of FIG. 3., and is thus not further described. Step 602 differs from step 302 in that it produces a prediction model for the distribution of the number of active devices, rather than the number of active devices itself. In a preferred embodiment, step 602 divides the observed data into disjoint time intervals (for example the data collected during one month is divided into 4 intervals each of which contains one week worth of data), computes the distribution of the number of active devices during each interval, and uses a linear method to construct a prediction model. In a different embodiment, step 602 uses a parametric family to model the distribution of number of active devices, and fits a prediction model to the parameters using the values estimated during the different intervals. In another embodiment, step 602 also accounts for seasonal (daily, weekly, monthly, and so forth) variations in the distribution of the number of active devices.

The expected values of the prediction parameters at each future time instant t are computed (step 603), using the regression model of the prediction parameters and the prediction model for the distribution of the number of active devices. Steps 604 and 605 are analogous to steps 304 and 305 of FIG. 3, and are thus not further described.

The current invention also teaches how to use the prediction model of the distribution of the number of active devices to the methods of FIGS. 4 and 5. For example, FIG. 7 shows how to adapt the method of FIG. 4 to use a prediction model of the distribution of the number of active devices.

Figure 7:
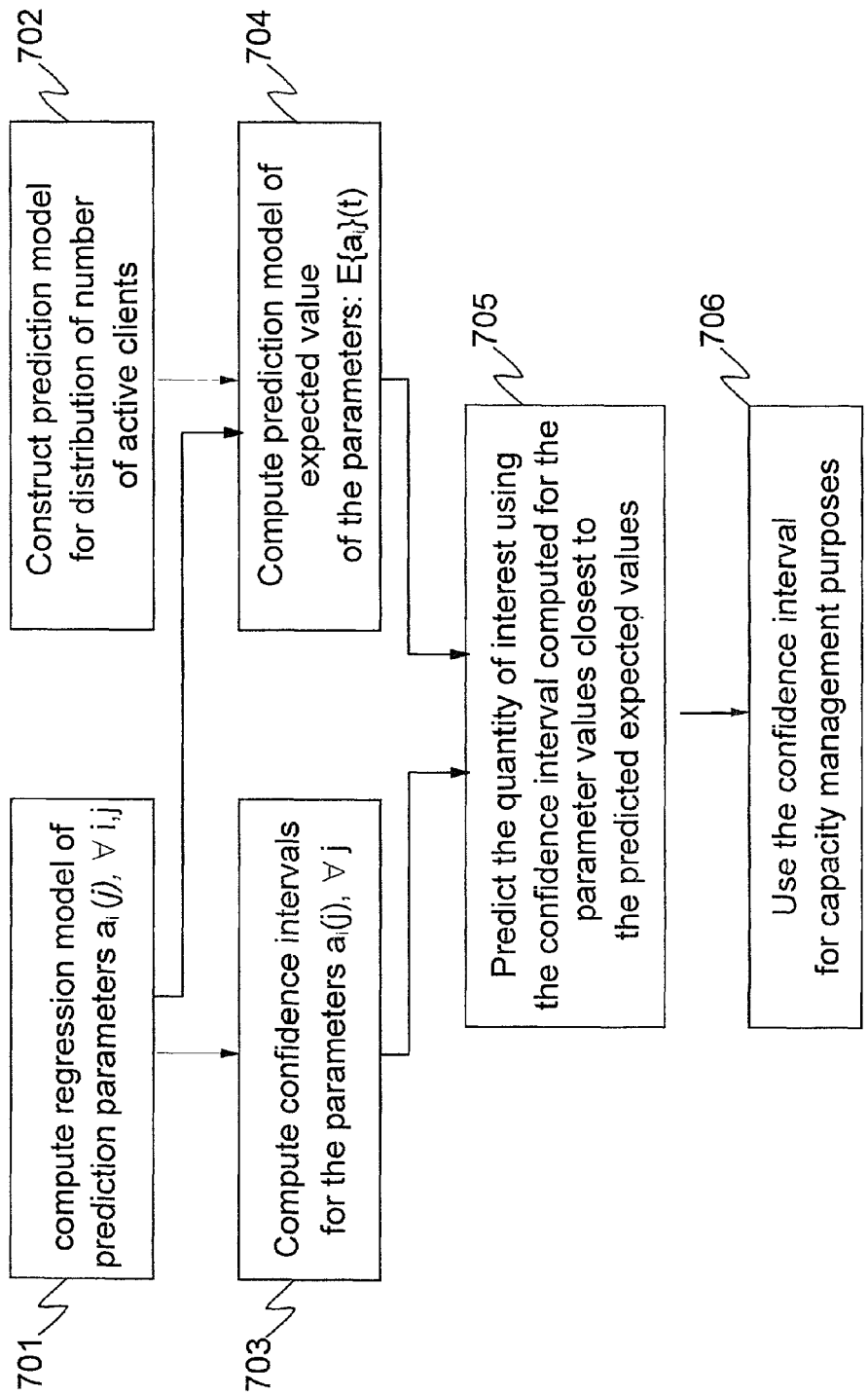
FIG. 7 is a flow diagram illustrating a method for combining the method of FIG. 2 with a predictive model of the distribution of the number of active devices to produce confidence intervals to predict the utilization of a resource, according to an illustrative embodiment of the present invention.

FIG. 7 is a flow diagram illustrating a method for combining the method of FIG. 2 with a predictive model of the distribution of the number of active devices to produce confidence intervals to predict the utilization of a resource, according to an illustrative embodiment of the present invention.

In a preferred embodiment, Step 701 corresponds to the method of FIG. 2, and is analogous to Step 401.

Step 703 further computes the confidence intervals for the regression model of the prediction parameters, and is analogous to step 403. Step 702 constructs a prediction model of the empirical distribution of the number of active devices, and is analogous to Step 602.

The expected values of the prediction parameters are computed (step 704) using the regression model of the prediction parameters and the prediction model of the distribution of the number of active devices.

The resource of interest is predicted (step 405), using the confidence intervals for the expected values of the parameters. One of ordinary skill in the related art will appreciate that for step 405 to achieve the desired confidence of the prediction, step 403 must select the value of the confidence accordingly. In a preferred embodiment, where the k prediction parameters are independent, and where the desired confidence associated with the prediction of step 405 is p (e.g., p=95%, namely, 0.95), step 403 must yield $(p)^{1/k}$ confidence intervals. Step 405 produces a confidence region for the predicted resource, namely, it produces a confidence interval for each predicted time.

The confidence region for the predicted resource is used for capacity management purposes (step 706).

Figure 8:
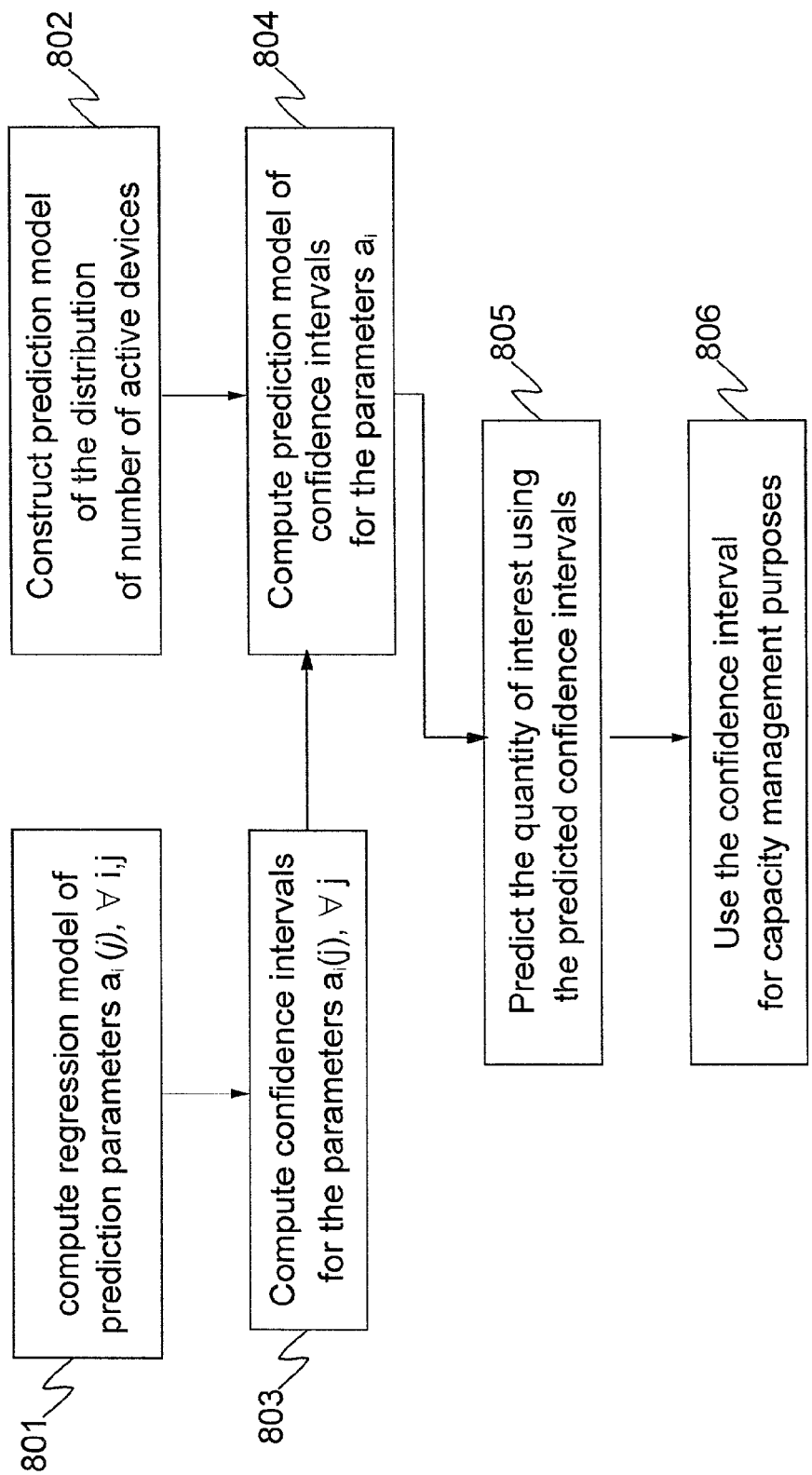
FIG. 8 is a flow diagram illustrating another method for combining the method of FIG. 2 with a predictive model of the distribution of the number of active devices, to produce confidence intervals to predict the utilization of a resource, according to another illustrative embodiment of the present invention.

FIG. 8 shows how to adapt the method of FIG. 5 to use a prediction model of the distribution of the number of active devices. In particular, FIG. 8 is a flow diagram illustrating another method for combining the method of FIG. 2 with a predictive model of the distribution of the number of active devices, to produce confidence intervals to predict the utilization of a resource, according to another illustrative embodiment of the present invention.

Steps 801 and 803 are analogous to the corresponding steps 501 and 503 of FIG. 5, and are thus not further described. Step 802 constructs a prediction model of the distribution of the number of active devices, and is analogous to step 702 of FIG. 7.

A confidence interval for the prediction parameters is produced (step 804), by combining the prediction model of the distribution of the number of active devices and the confidence intervals for the prediction parameter (i.e., one interval per each value of the number of active devices). It is to be appreciated that step 804 operates on each prediction parameter individually. Moreover, it is to be appreciated that steps 801 to 804 model the prediction parameters as random variables, decompose the distribution of individual parameters into a plurality of conditional distributions given the number of active devices, and combine said conditional distributions using the time-dependent marginal distribution of the number of active devices. Accordingly, one of ordinary skill in the related art will readily contemplate how to implement the steps of FIG. 8 to reflect different assumptions on the conditional and marginal distributions. Steps 805 and 806 are analogous to steps 505 and 506 of FIG. 5, and are thus not further described.

Advantageously, the present invention also provides a method that describes how to use the information on the number of active devices to detect saturation in available resources. The method relies only on observations of the monitored quantities and of the number of active devices. The method does not require adding any load (artificial, simulated or real) to the network.

Figure 9:
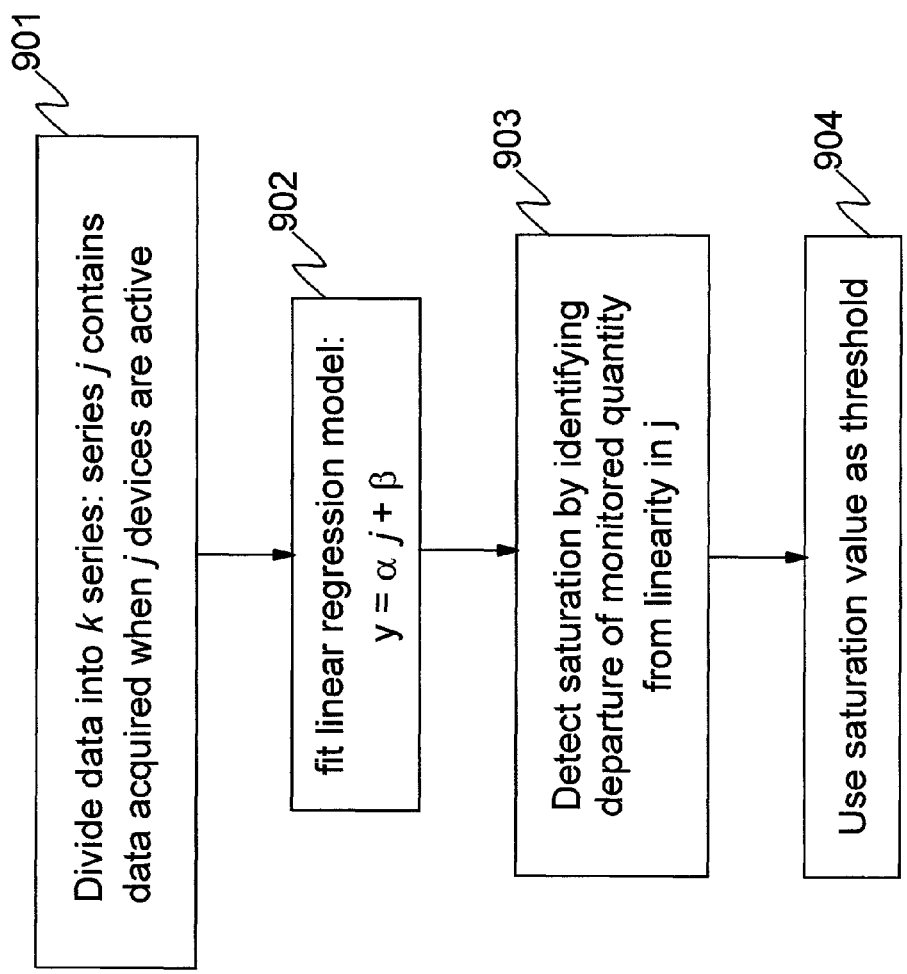
FIG. 9 is a flow diagram illustrating a method for detecting resource saturation in terms of departure of prediction parameters from linearity in the number of active devices in a computer system, according to an illustrative embodiment of the present invention.

FIG. 9 is a flow diagram illustrating a method for detecting resource saturation in terms of departure of prediction parameters from linearity in the number of active devices in a computer system, according to an illustrative embodiment of the present invention.

The time series of the monitored resource being analyzed for signs of saturation is divided into k pairwise disjoint time series, where series contains data acquired when j devices are active in the network (step 901). It is possible that one or more of the k series is empty, and the empty series are discarded in the other steps of FIG. 9.

The monitored resource is regressed on the number of active devices via a linear regression model (step 902). Saturation of the monitored resource is detected by identifying departure of the monitored resource from linearity in j (step 903). One of ordinary skill in the art would appreciate that departure from linearity can be detected using methods such as those taught by Kutner et al., in "Applied Statistical Models", Richard D. Irwin, Inc., chapter 4, 1985.

Figure 10:
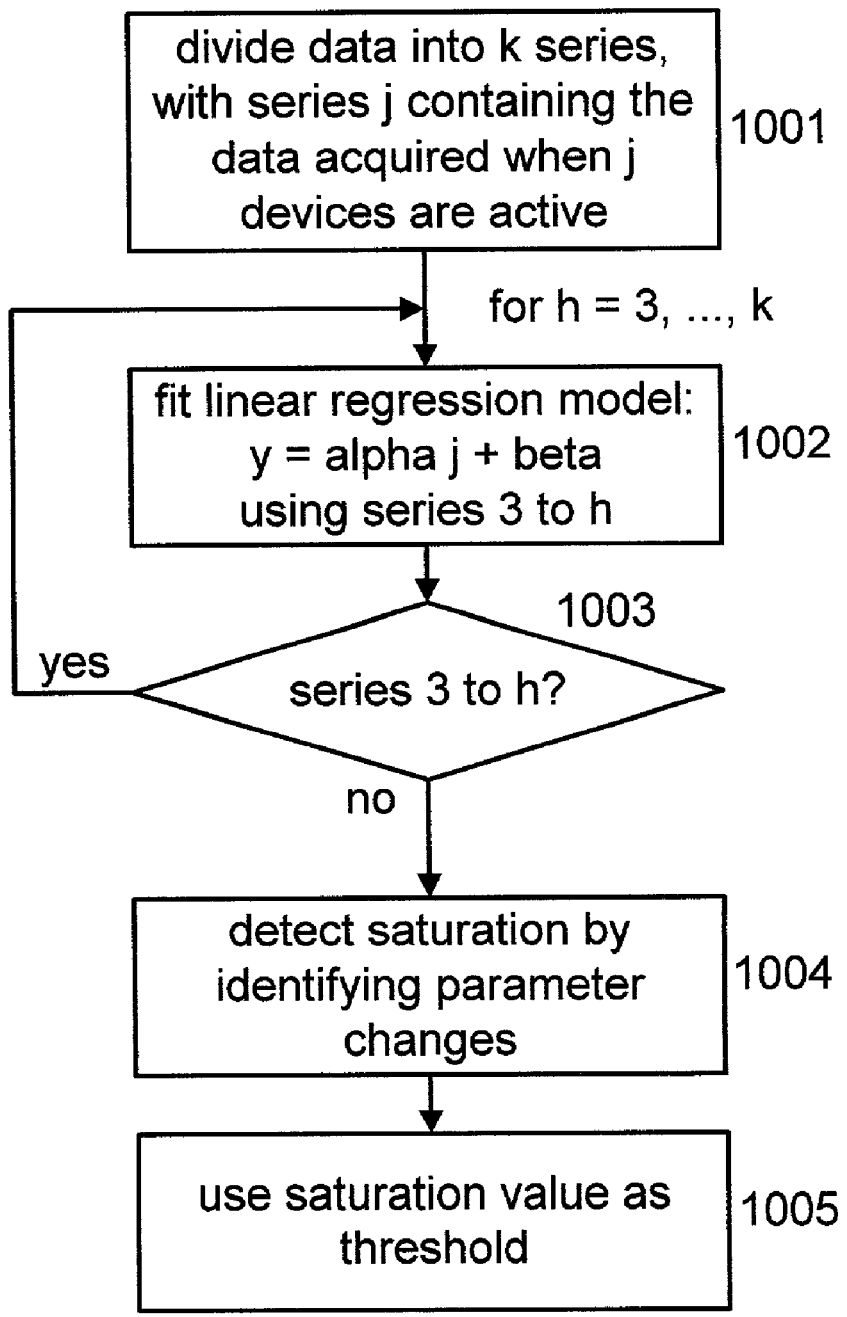
FIG. 10 is a flow diagram illustrating another method for detecting resource saturation in terms of departure of prediction parameters from linearity in the number of active devices in a computer system, according to another illustrative embodiment of the present invention.

FIG. 10 is a flow diagram illustrating another method for detecting resource saturation in terms of departure of prediction parameters from linearity in the number of active devices in a computer system, according to another illustrative embodiment of the present invention.

Step 1001 divides the time series of the monitored resource being analyzed for signs of saturation into k pairwise disjoint time series, where series j contains data acquired when j devices are active in the network, and is analogous to step 901. As in FIG. 9, it is possible that one or more of the k series is empty, and the empty series are discarded in the other steps of FIG. 10.

The loop formed by steps 1002 and 1003 iterates over the number of active devices h and, for each value of h, regresses the monitored resource on the number of active devices via a linear regression model. Step 1004 detects saturation of the monitored resource by identifying departure of the monitored resource from linearity in j. One of ordinary skill in the related art will readily appreciate that departure from linearity can be detected using methods such as those taught by Kutner et al., in "Applied Statistical Models", Richard D. Irwin, Inc., chapter 4 1985.

The saturation value is used as a threshold (step 1005).

Figure 11:
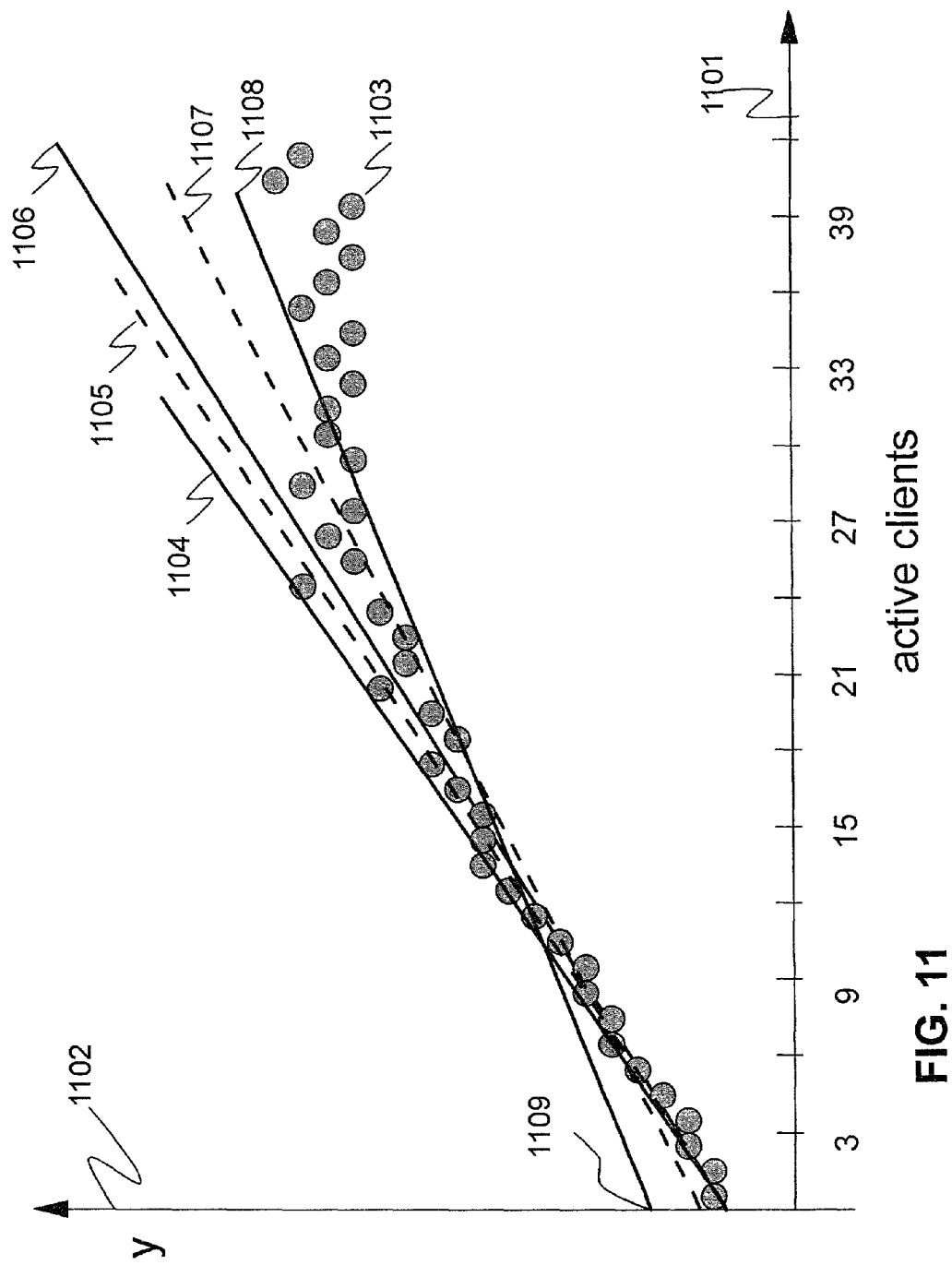
FIG. 11 is a diagram of a graph for detecting resource saturation using the method of FIG. 10, according to an illustrative embodiment of the present invention.

FIG. 11 is a diagram of a graph for detecting resource saturation using the method of FIG. 10, according to an illustrative embodiment of the present invention. A graph of the average value of the monitored resource y 1102 is shown, for example, the number of I/O requests served by a network storage device, as a function of the number of active clients 1101. The method of FIG. 10 considers first the three leftmost points in the graph, and fits a linear regression line 1104. The method then progressively considers larger number of points by increasing the maximum number of active clients considered, and produces a linear regression curve for each set of point. For example, the dashed line 1105 is the regression line obtained by regressing points from 1 to 15 active clients, while the solid line 1106 corresponds to active clients varying from 1 to 25. All these lines are very close to each other, as the corresponding parameters are similar. When the number of clients exceeds 27, the system starts showing signs of saturation. This is reflected in the regression lines: the dashed line 1107 corresponds to active devices ranging from 1 to 33 and the solid line 1108 corresponds to active devices ranging from 1 to 39. It is immediately clear that the slope parameter abruptly departs from the value observed when considering up to 27 active devices. The intercept parameter varies abruptly too, as is evident from the intercept 1109. One of ordinary skill in the related art will readily appreciate how the detection of the sudden changes of the parameters can be performed via ordinary change detection techniques.

Figure 12:
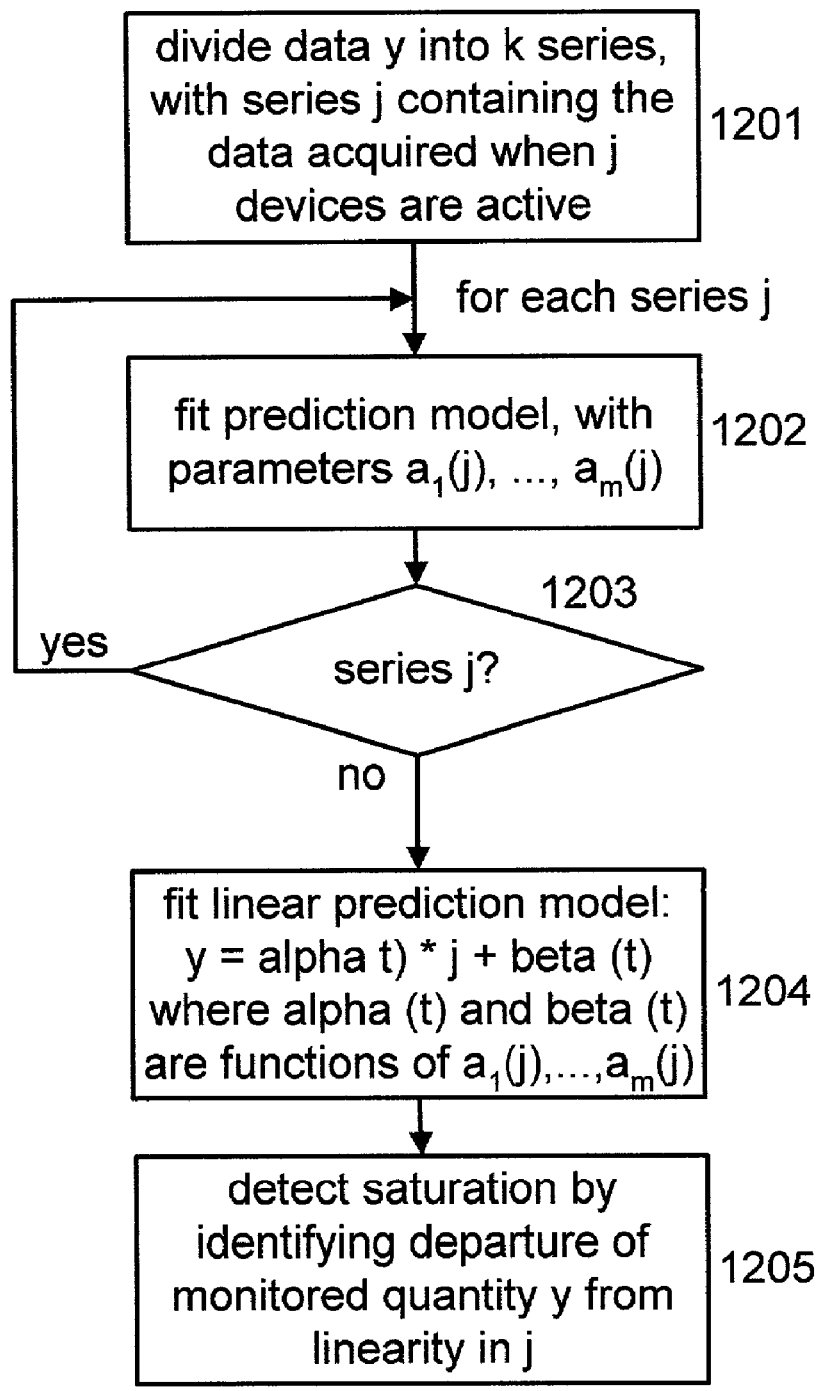
FIG. 12 is a flow diagram illustrating a method for detecting resource saturation by identifying departure of resource utilization from linearity in the number of active devices of a computer system, according to an illustrative embodiment of the present invention.

FIG. 12 is a flow diagram illustrating a method for detecting resource saturation by identifying departure of resource utilization from linearity in the number of active devices of a computer system, according to an illustrative embodiment of the present invention. This method accounts for the dependence of the monitored resource on both time and number of active devices.

The time series of the monitored resource is divided into k series, where series j contains data acquired when j devices are active (step 1201). Each series is analyzed separately in step 1202, which fits a prediction model having m parameters $a_1(j)$ to $a_m(j)$ to the time series corresponding to j active clients. The loop formed by steps 1202 and 1203 invokes step 1202 on the k distinct time series generated by step 1201, and then continues the computation at step 1204. Step 1204 is similar to step 902, and fits a linear prediction model to the monitored resource as a function of the number of active devices. Unlike step 902, step 1204 produces linear prediction parameters a and b that are not constant, but vary with time, and are functions of all the prediction parameters generated in step 1202. Step 1205 detects saturation by identifying departure from linearity, as in step 903 of FIG. 9. One of ordinary skill in the related art will readily recognize how to extend the method of FIG. 10 to account for time-dependency of the prediction parameters, by repeating the steps that extended the method of FIG. 9 to the method of FIG. 12.

In general, and especially on a large network, not all the monitored quantities will be affected by all the devices on the network. More specifically, the set of relevant devices to a monitored resource is defined as the collection of network devices that affect the monitored resource. The methods of FIGS. 3-10 and 12 can be readily modified by one of ordinary skill in the related art to account only for the set of relevant devices, while maintaining the spirit and scope of the present invention. For example, FIG. 13 teaches how to modify the method of FIG. 3.

Figure 13:
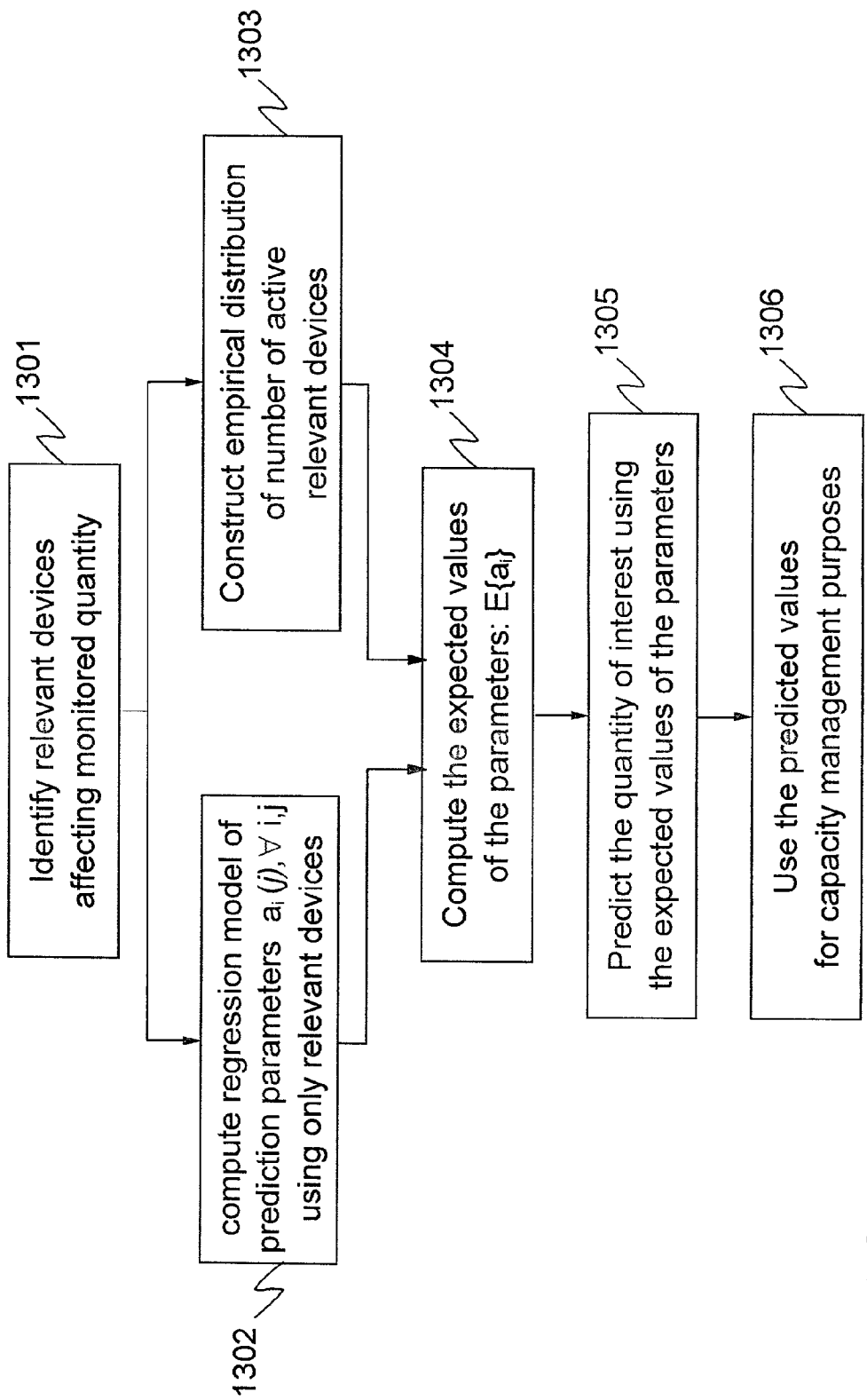
FIG. 13 is a flow diagram illustrating a method for forecasting the utilization of a resource based on the number of active devices in a computer system that affect the resource, according to an illustrative embodiment of the present invention.

FIG. 13 is a flow diagram illustrating a method for forecasting the utilization of a resource based on the number of active devices in a computer system that affect the resource, according to an illustrative embodiment of the present invention. The set of relevant devices with respect to the monitored resource being analyzed are identified (step 1301). A regression model of the prediction parameters on the number of relevant active devices is produced (step 1302). The empirical distribution of the number of active relevant devices is computed (step 1303). The expected value of the prediction parameters is computed (step 1304), using the regression model of the prediction parameters and the empirical distribution of relevant devices. The resource of interest is predicted (step 1305), using the expected values of the prediction parameters. The predicted values are then used for capacity management purposes (step 1306). Using FIGS. 3 and 13 as a starting point, one of ordinary skill in the related art will readily extend the methods of FIGS. 4-10 and 12 to operate with the set of relevant devices, while maintaining the spirit and scope of the present invention.

Figure 14:
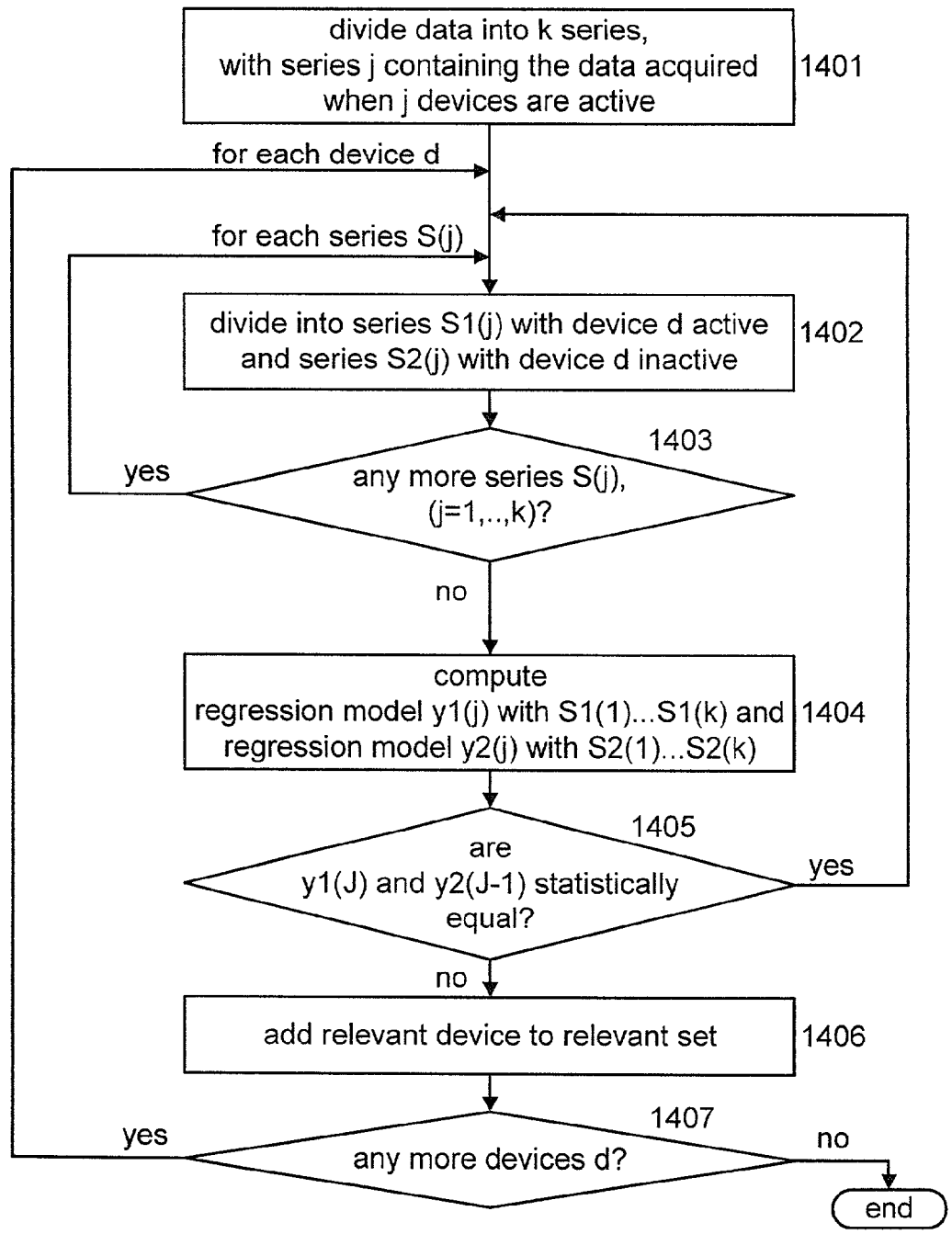
FIG. 14 is a flow diagram illustrating a method for identifying devices that affect a monitored resource in a computer system, according to an illustrative embodiment of the present invention.

In a preferred embodiment of the present invention, the construction of the relevant device set for monitored quantities is performed according to the method described in FIG. 14. This method is applied separately to each monitored resource.

FIG. 14 is a flow diagram illustrating a method for identifying devices that affect a monitored resource in a computer system, according to an illustrative embodiment of the present invention. The time series of the resource of interest is divided into k time series, where series j contains data acquired when j devices are active (step 1401).

The devices are then analyzed individually, to decide whether they belong to the relevant set. The loop terminating at step 1407 controls the flow of operations by restricting the following analysis to one device at a time, by applying the analysis to all the devices, and by terminating the computation when all the devices have been analyzed (a negative response to the determination of step 1407 denotes that the relevant set has been computed).

The loop terminating at step 1403 iterates on the time series produced by step 1401, and applies analysis step 1402 to each of the time series separately. Step 1402 divides the time series S(J) into S1(J), acquired when the device being analyzed is active, and time series S2(J), acquired when the device being analyzed is inactive. When step 1403 terminates the iteration and all time series have been partitioned into two, the partitioned time series are used in step 1404.

Step 1404 uses the time series S1(1), . . . , S1(k) to compute a regression model y1(J) for the resource of interest on the number of active devices. Additionally, step 1404 uses the time series S2(1), . . . , S2(k) to compute a regression model y2(J) for the resource of interest on the number of active devices. Intuitively, y1(J) captures the dependence of the resource being monitored on the number of active devices when device d is active, while y2(J) captures the dependence of the resource being monitored on the number of active devices when device d is inactive. If device d is relevant, then y1(J) is constructed with the constraints that at least one of the active devices is relevant. If device d is irrelevant, then y1(J) is constructed with the constraint that at least one of the devices is irrelevant to the resource of interest, while y2(J) is constructed without such constraint. If device d is irrelevant, then y1(J) should be identical (up to statistical variations) to y2(J−1), because both models are constructed with J−1 unconstrained devices, and, since device d is irrelevant, it does not affect y1(J).

It is then determined whether y1(J) is identical up to statistical variations to y2(J−1) (step 1405). If so, then device d is discarded and the method returns to step 1402. Otherwise, device d is added to the relevant set (step 1407), and the method proceeds to step 1407. At step 1407, it is determined whether there are any devices d. If so, then the method returns to step 1402. Otherwise, the method is terminated.

Figure 15:
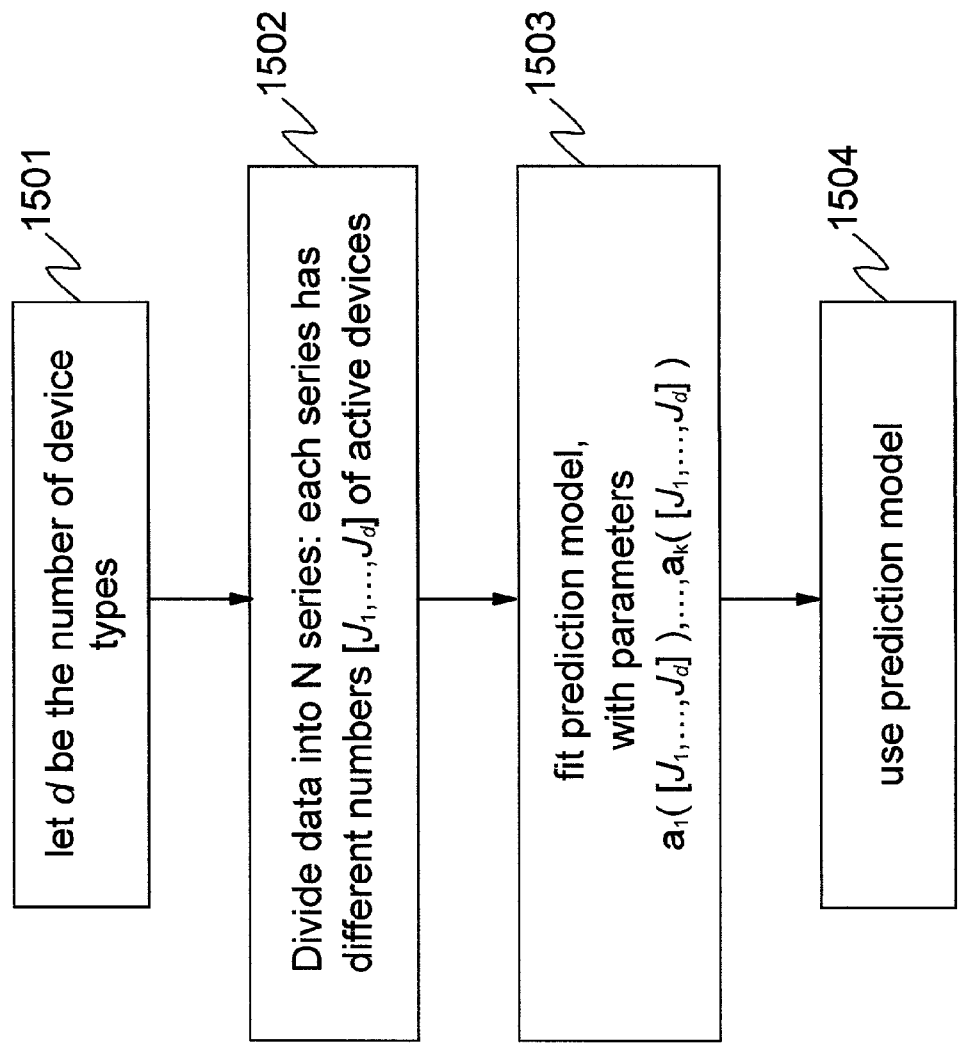
FIG. 15 is a flow diagram illustrating a method for predicting resource utilization as a function of the number of active devices in different device classes in a computer system, according to an illustrative embodiment of the present invention.

In general a network connects heterogeneous devices, such as personal computers, portable computers, workstations, network attached disks, distributed storage servers, webservers, database-servers, firewalls, and so forth. Different device types might have different impact on the network resources. FIG. 15 describe a method for taking into account the different types of devices according to the spirit of the current invention.

FIG. 15 is a flow diagram illustrating a method for predicting resource utilization as a function of the number of active devices in different device classes in a computer system, according to an illustrative embodiment of the present invention. At step 1501, d different categories or types of devices are identified. At each point in time, $J_1$ devices of type 1, $J_2$ devices of type 2, and so forth, will be active on the network. These numbers can be collected into a vector $J=[J_1, \ldots, J_d]$.

The time series of the monitored resource is divided into N subseries, where each subseries is characterized by a different value of the vector J (step 1502). A prediction model for the monitored resource is fit (step 1503), using the series and the corresponding vectors J. The model has parameters $a_1, \ldots, a_k$, which are functions of the vector J. The prediction model is used in step 1504. It is readily apparent to one of ordinary skill in the related art that the method of FIG. 16 can be used in the methods of FIGS. 3-10 and 12-15 to yield multivariate prediction and regression models (i.e., based on a vector J), rather than univariate models (i.e., based only on the total number of active devices J). Fitting multivariate regression and prediction models is known in the art. For example, see Kutner et al., in "Applied Statistical Models", Richard D. Irwin, Inc., chapters 7 and 8, 1985.

Figure 16:
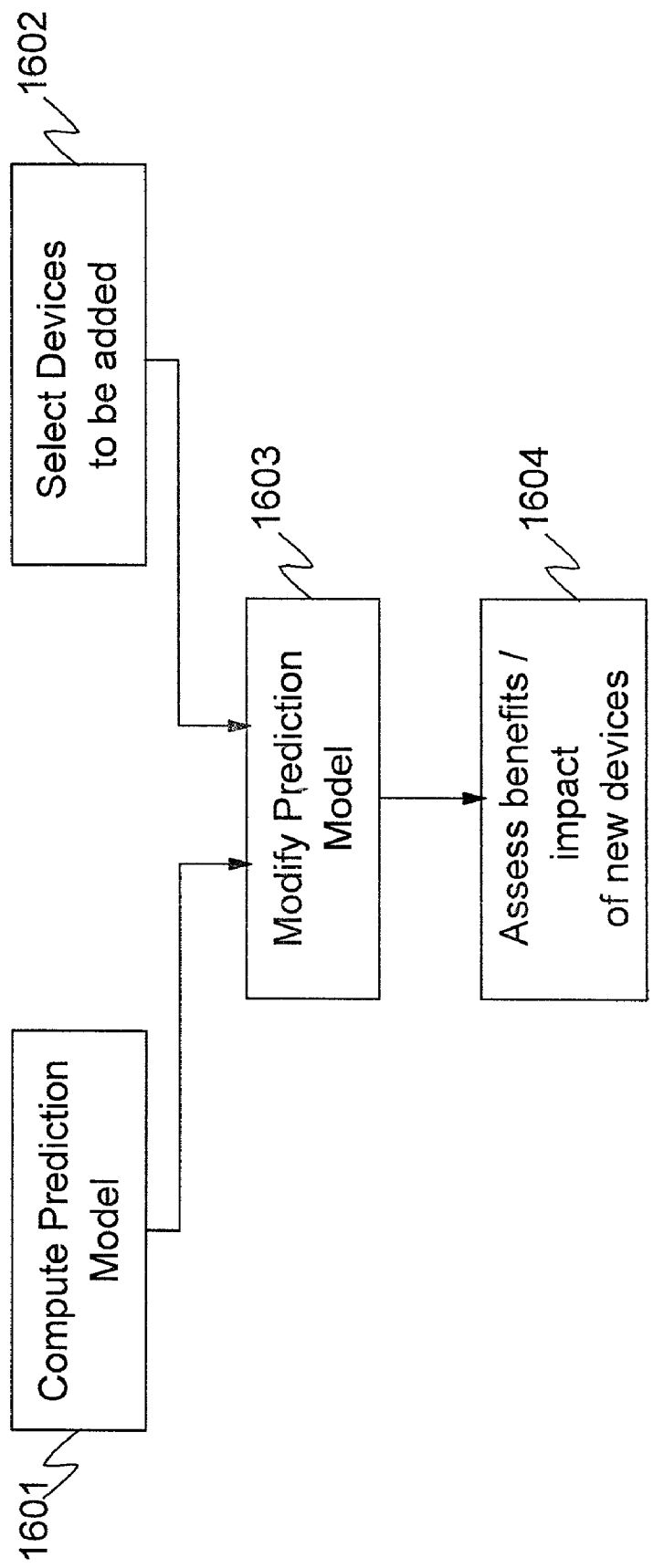
FIG. 16 is a flow diagram illustrating a general method for predicting the impact of adding a new device to a computer network, according to an illustrative embodiment of the present invention.

FIG. 16 is a flow diagram illustrating a general method for predicting the impact of adding a new device to a computer network, according to an illustrative embodiment of the present invention. A prediction model for the resource being analyzed is produced (step 1601). A new device to be added is selected (step 1602). In a preferred embodiment, step 1602 also contains the steps of specifying the type of device, and the resources for which the device is relevant. For example, the user might be interested in adding a distributed storage server to a specific LAN; this new storage server probably affects the same set of resources as the other storage servers already present on the LAN.

The prediction model is modified to account for the new device (step 1603). The benefits/impacts of the new device are assessed (step 1604). In a preferred embodiment, assessing the impact of a new device is performed using the method of FIG. 17.

Figure 17:
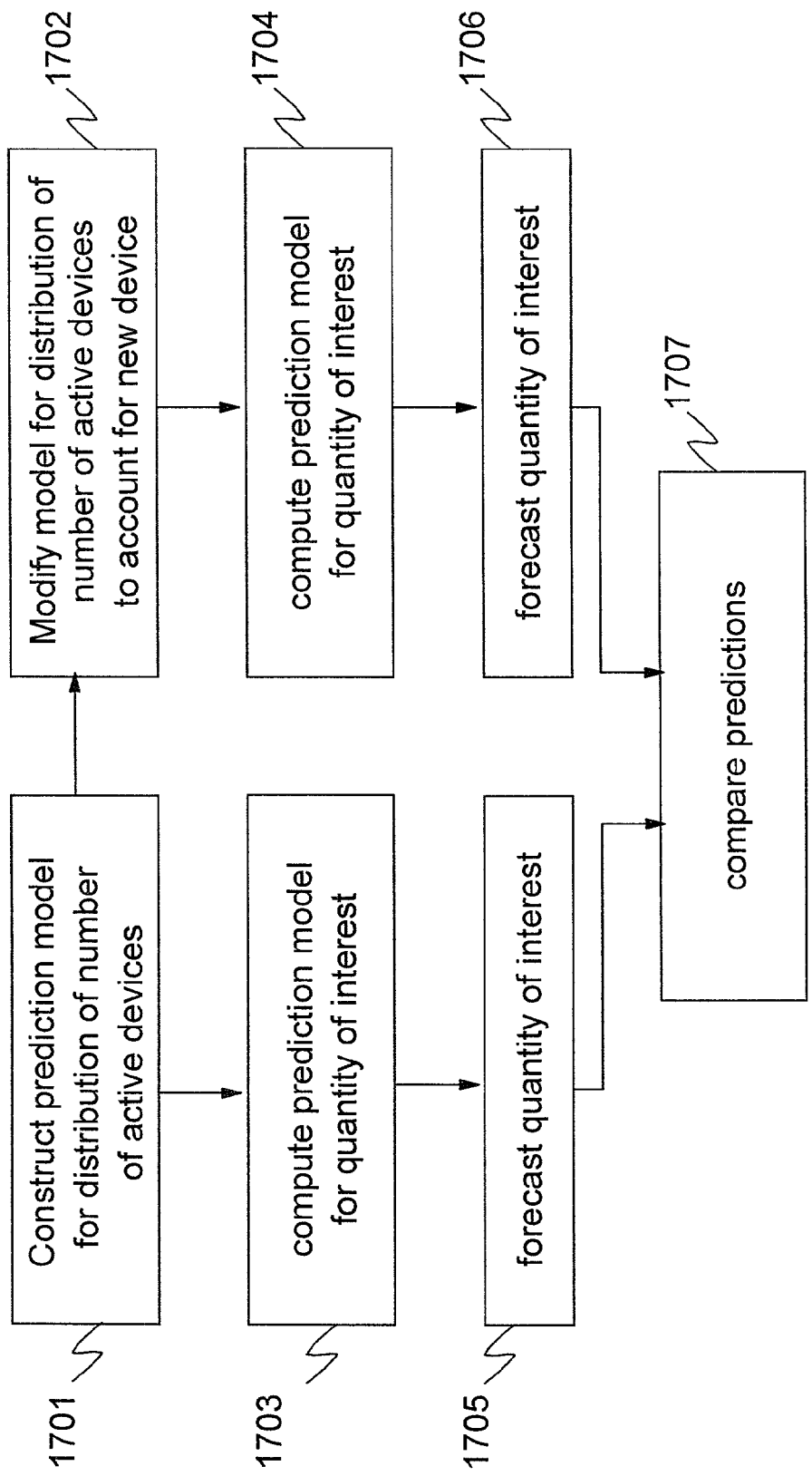
FIG. 17 is a flow diagram illustrating a specific method for predicting the impact of adding a new device to a computer network, according to an illustrative embodiment of the present invention.

FIG. 17 is a flow diagram illustrating a specific method for predicting the impact of adding a new device to a computer network, according to an illustrative embodiment of the present invention.

A prediction model for the distribution of the number of active devices is computed (step 1701). In a different embodiment, step 1701 computes a prediction model for the distribution of the vector J, containing the numbers of active devices of the different d classes.

The model produced at step 1701 is modified to account for the new device (step 1702). In a preferred embodiment where step 1701 computes a model for the distribution of J, and the new device is of class c, step 1702 uses the model produced by step 1701, and modifies that model under the simplifying assumption that the uptime of the new device is independent of the number of other active devices. In different embodiments, more complex methods can be used, which take into account the topology of the network, and the interdependencies of different devices. Given the teachings of the present invention provided herein, one of ordinary skill in the related art will contemplate these and various other methods for modifying a model to account for a new device, while maintaining the spirit and scope of the present invention.

A prediction model of the resource of interest is produced (step 1703), based upon the model produced at 1701. Another prediction model of the resource of interest is produced (step 1704), based upon the modified model produced at step 1702.

A forecast (prediction) of the resource of interest is produced (step 1705), based upon the prediction model produced at step 1703. Another forecast (prediction) of the resource of interest is produced (step 1706), based upon the prediction model produced at step 1704. The forecasts are then compared (step 1707).

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for predicting a subsequent resource utilization in a computer system having a plurality of devices, comprising the steps of:
   monitoring, over a period of time, a contemporaneous resource utilization and a number of active devices to obtain monitored values of the contemporaneous resource utilization and the number of active devices; and
   predicting the subsequent resource utilization, based upon the monitored values of the contemporaneous resource utilization and the number of active devices.

2. The method of claim 1, wherein said predicting step further comprises the steps of:
   computing a regression model of prediction parameters on the number of active devices;
   constructing an empirical distribution of the number of active devices; and
   combining the regression model and the empirical distribution to produce a prediction model.

3. The method of claim 2, wherein said step of combining the regression model and the empirical distribution comprises the step of computing, with respect to the empirical distribution, an expected value of each of one or more of the prediction parameters.

4. The method of claim 3, wherein said combining step further comprises the steps of:
   for each of the one or more prediction parameters,
   for each of the monitored values of the number of active devices, computing confidence intervals for the one or more prediction parameters; and
   selecting a corresponding one of the confidence intervals for the expected value of each of the one or more prediction parameters.

5. The method of claim 3, wherein said combining step further comprises the steps of:
   computing confidence intervals for the prediction parameters, for each of the monitored values of the number of active devices; and
   combining the confidence intervals with the empirical distribution, to produce modified confidence intervals for the prediction parameters.

6. The method of claim 1, further comprising the step of managing a resource capacity of the computer system, based upon the predicted subsequent resource utilization.

7. The method of claim 1, wherein the computer system comprises computer software, and said method further comprising the step of rejuvenating the computer software, based upon the predicted subsequent resource utilization.

8. The method of claim 1, further comprising the step of dynamically allocating at least one resource of the computer system, based upon the predicted subsequent resource utilization.

9. The method of claim 1, wherein said predicting step comprises the steps of:
   identifying any of the plurality of devices that are relevant to a monitored resource; and
   restricting at least one subsequent operation of the computer system that corresponds to the monitored resource to use only devices identified as relevant to the monitored resource from among the plurality of devices.

10. The method of claim 9, wherein said identifying step comprises the steps of:
    for a given device currently being evaluated for relevance to the monitored resource, computing a first regression model for the monitored resource on the number of active devices, based upon data acquired when the given device is active;

computing a second regression model for the monitored resource on the number of active devices, based upon data acquired when the given device is inactive; and comparing the first and the second regression models to determine whether the given device is relevant to the monitored resource.

11. The method of claim 10, wherein said comparing step comprises the step of determining whether the first and the second regression models are statistically equivalent for a same number of active devices other than the given device.

12. The method of claim 1, wherein said predicting step comprises the steps of:

dividing the plurality of devices into device classes; and counting the number of active devices in each of the device classes.

13. The method of claim 12, further comprising the step of fitting a prediction model for a monitored resource, wherein prediction model parameters of the prediction model depend on the number of active devices in each of the device classes.

14. The method of claim 12, further comprising the step of computing a prediction model for the number of active devices in each of the device classes.

15. The method of claim 1, wherein said predicting step comprises the steps of:

computing a regression model of prediction parameters on the number of active devices;

constructing a prediction model for a distribution of the number of active devices; and combining the regression model and the prediction model for the distribution of active devices to produce a prediction model for one or more of the prediction parameters.

16. The method of claim 15, wherein said predicting step further comprises the steps of:

computing a regression model of prediction parameters on the number of active devices;

constructing an empirical distribution of the number of active devices; and combining the regression model and the empirical distribution to produce a prediction model.

17. The method of claim 16, wherein said step of combining the regression model and the empirical distribution comprises the step of computing an expected value of the prediction parameters with respect to the empirical distribution.

18. The method of claim 17, wherein said combining step further comprises the steps of:

for each of the one or more prediction parameters, for each of the monitored values of the number of active devices, computing confidence intervals for the one or more prediction parameters; and selecting a corresponding one of the confidence intervals for the expected value of each of the one or more prediction parameters.

19. The method of claim 17, wherein said combining step further comprises the steps of:

computing confidence intervals for the prediction parameters for each of the monitored values of the number of active devices; and combining the confidence intervals for the prediction parameters for each of the monitored values of the number of active devices with the empirical distribution of the number of active devices, to produce modified confidence intervals for the prediction parameters.

20. The method according to claim 1, wherein said method is implemented by a program storage device readable by machine, tangibly embodying a program of instructions executable by the machine to perform said method steps.

21. A method for identifying resource saturation in a computer system having a plurality of devices, comprising the steps of:

monitoring, over a period of time, resource utilization and a number of active devices to obtain monitored values of the resource utilization and the number of active devices; and identifying resource saturation, based upon the monitored values of the resource utilization and the number of active devices.

22. The method of claim 21, wherein said identifying step comprises the steps of:

fitting a regression model of a monitored resource on the number of active devices; and detecting, in the regression model, departures of the monitored resource from linearity.

23. The method of claim 21, wherein said identifying step comprises the steps of:

fitting a regression model of prediction parameters of the monitored resource on the number of active devices; and detecting departures from linearity of the prediction parameters of the monitored resource.

24. The method of claim 21, wherein said identifying step comprises the steps of:

identifying any of the plurality of devices that are relevant to a monitored resource; and restricting at least one subsequent operation of the computer system that corresponds to the monitored resource to use only devices identified as relevant to the monitored resource from among the plurality of devices.

25. The method of claim 24, wherein said identifying step comprises the steps of:

for a given device currently being evaluated for relevance to the monitored resource, computing a first regression model for the monitored resource on the number of active devices, based upon data acquired when the given device is active;

computing a second regression model for the monitored resource on the number of active devices, based upon data acquired when the given device is inactive; and comparing the first and the second regression models to determine whether the given device is relevant to the monitored resource.

26. The method of claim 24, wherein said comparing step comprises the step of determining whether the first and the second regression models are statistically equivalent for a same number of active devices other than the given device.

27. The method of claim 21, wherein said identifying step comprises the steps of:

dividing the plurality of devices into device classes; and counting the number of active devices in each of the device classes.

28. The method of claim 27, further comprising the step of fitting a prediction model for a monitored resource, wherein prediction model parameters of the prediction model depend on the number of active devices in each of the device classes.

29. The method of claim 27, further comprising the step of computing a prediction model for the number of active devices in each of the device classes.

30. The method according to claim 21, wherein said method is implemented by a program storage device readable by machine, tangibly embodying a program of instructions executable by the machine to perform said method steps.

31. A method for predicting effects of adding a new device on a computer system having a plurality of devices, the method comprising the steps of:
- monitoring, over a period of time, a resource utilization and a number of active devices to obtain monitored values of the resource utilization and the number of active devices; and
- predicting the effects of adding the new device, based upon the monitored values of the resource utilization and the number of active devices.

32. The method of claim 31, wherein said predicting step comprises the steps of:
- selecting a monitored resource; and
- predicting the effects of adding the new device with respect to the selected monitored resource, based upon the monitored values of the resource utilization and the number of active devices.

33. The method of claim 32, wherein said predicting step comprises the steps of:
- constructing a first prediction model of a distribution of the number of active devices; and
- modifying the first prediction model to produce a modified prediction model of the distribution of the number of active devices that accounts for the new device.

34. The method of claim 33, further comprising the steps of:
- computing a first prediction model for the selected monitored resource, based upon the first prediction model of the distribution of the number of active devices;
- producing a first prediction of the selected monitored resource using the first prediction model for the selected monitored resource;
- computing a modified prediction model for the selected monitored resource to account for the new device, based upon the modified prediction model of the distribution of the number of active devices;
- producing a second prediction of the selected monitored resource, based upon the modified prediction model for the selected monitored resource; and
- comparing the first prediction and the second prediction of the selected monitored resource to evaluate the effects of adding the new device.

35. The method of claim 31, wherein said predicting step comprises the step of:
- dividing the plurality of devices into device classes; and
- counting the number of active devices in each of the device classes.

36. The method of claim 32, further comprising the steps of:
- identifying any of the plurality of devices that are relevant to a monitored resource; and
- restricting at least one subsequent operation of the computer system that corresponds to the monitored resource to use only devices identified as relevant to the monitored resource from among the plurality of devices.

37. The method according to claim 31, wherein said method is implemented by a program storage device readable by machine, tangibly embodying a program of instructions executable by the machine to perform said method steps.

38. An apparatus for predicting a subsequent resource utilization in a computer system having a plurality of devices, comprising:
- a monitoring device for monitoring, over a period of time, a contemporaneous resource utilization and a number of active devices to obtain monitored values of the contemporaneous resource utilization and the number of active devices; and
- a prediction device for predicting the subsequent resource utilization, based upon the monitored values of the contemporaneous resource utilization and the number of active devices.

39. An apparatus for identifying resource saturation in a computer system having a plurality of devices, comprising:
- a monitoring device for monitoring, over a period of time, resource utilization and a number of active devices to obtain monitored values of the resource utilization and the number of active devices; and
- a forecasting device for identifying resource saturation, based upon the monitored values of the resource utilization and the number of active devices.

40. An apparatus for predicting effects of adding a new device on a computer system having a plurality of devices, the apparatus comprising:
- a monitoring device for monitoring, over a period of time, a resource utilization and a number of active devices to obtain monitored values of the resource utilization and the number of active devices; and
- a forecasting device for predicting the effects of adding the new device, based upon the monitored values of the resource utilization and the number of active devices.

41. A method for predicting a subsequent resource utilization in a computer system having a plurality of devices, the plurality of devices comprising active devices and non-active devices, comprising the steps of:
- monitoring, over a period of time, a contemporaneous resource utilization to obtain first monitored values of the contemporaneous resource utilization;
- monitoring, over the period of time, a number of the active devices to obtain second monitored values of the number of the active devices, wherein the monitored number is capable of varying over the period of time;
- monitoring, over the period of time, a type of each of the active devices to obtain third monitored values of the type of the each of the active devices; and
- predicting the subsequent resource utilization, based upon the first monitored values, the second monitored values, and the third monitored values.

* * * * *